(12) United States Patent
Hwang et al.

(10) Patent No.: US 12,350,818 B2
(45) Date of Patent: Jul. 8, 2025

(54) JOINT DEVICE FOR ROBOT

(71) Applicant: SAMSUNG ELECTRONICS CO., LTD., Suwon-si (KR)

(72) Inventors: Cheoggyu Hwang, Suwon-si (KR); Jinwoong Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 256 days.

(21) Appl. No.: 18/096,434

(22) Filed: Jan. 12, 2023

(65) Prior Publication Data

US 2023/0158691 A1    May 25, 2023

Related U.S. Application Data

(63) Continuation of application No. PCT/KR2021/008360, filed on Jul. 1, 2021.

(30) Foreign Application Priority Data

Jul. 28, 2020  (KR) .................. 10-2020-0093748
Sep. 22, 2020  (KR) .................. 10-2020-0122546

(51) Int. Cl.
*B25J 17/00*    (2006.01)

(52) U.S. Cl.
CPC .................... *B25J 17/00* (2013.01)

(58) Field of Classification Search
CPC ......... B25J 17/00; B25J 9/104; B25J 17/0275
See application file for complete search history.

(56) References Cited

U.S. PATENT DOCUMENTS

| | | | |
|---|---|---|---|
| 6,482,120 B2 | 11/2002 | Kumura et al. | |
| 7,857,727 B2 | 12/2010 | Rung | |
| 8,419,096 B2 | 4/2013 | Kim et al. | |
| 9,278,455 B2 | 3/2016 | Mushikami et al. | |

(Continued)

FOREIGN PATENT DOCUMENTS

| | | |
|---|---|---|
| CN | 109866250 A | 6/2019 |
| EP | 3 620 269 A1 | 3/2020 |

(Continued)

OTHER PUBLICATIONS

Ball et al., "MEDARM: a rehabilitation robot with 5DOF at the shoulder complex," IEEE, 2007, (6 pages total).

(Continued)

*Primary Examiner* — Victor L MacArthur
(74) *Attorney, Agent, or Firm* — Sughrue Mion, PLLC

(57) ABSTRACT

A joint device for a robot is provided. The present joint device includes: a first shaft; a second shaft disposed perpendicular to the first shaft; a first friction wheel rotatably supported by a first end of the first shaft; a second friction wheel rotatably supported by a second end of the first shaft; a driving device configured to rotate each of the first friction wheel and the second friction wheel; and a third friction wheel rotatably supported by a first end of the second shaft, and contacting the first friction wheel and the second friction wheels, wherein when the first friction wheel and the second friction wheel rotate in the same direction, the third friction wheel rotates in a pitch direction, and when the first friction wheel and the second friction wheel rotate in different directions, the third friction wheel rotates in a roll direction.

13 Claims, 6 Drawing Sheets

(56) References Cited

U.S. PATENT DOCUMENTS

| | | |
|---|---|---|
| 9,371,186 B2 | 6/2016 | Kiener et al. |
| 10,507,070 B2 | 12/2019 | Ugochuku |
| 11,318,605 B2 | 5/2022 | Füssl et al. |
| 11,541,555 B2 | 1/2023 | Cui et al. |
| 2008/0216596 A1 | 9/2008 | Madhani et al. |
| 2009/0238509 A1* | 9/2009 | Abraham ............ F16C 19/182 29/898.041 |
| 2011/0296944 A1 | 12/2011 | Carter et al. |
| 2013/0167673 A1 | 7/2013 | Teng et al. |
| 2015/0059511 A1 | 3/2015 | Mushikami et al. |
| 2015/0298909 A1 | 10/2015 | Kiener et al. |
| 2018/0055584 A1 | 3/2018 | Farritor et al. |
| 2020/0276720 A1 | 9/2020 | Cui et al. |
| 2021/0245363 A1 | 8/2021 | Füssl et al. |

FOREIGN PATENT DOCUMENTS

| | | |
|---|---|---|
| JP | 4770781 B2 | 9/2011 |
| JP | 5159994 B1 | 12/2012 |
| KR | 10-0236739 B1 | 4/2000 |
| KR | 10-0817865 B1 | 3/2008 |
| KR | 10-2016-0002664 A | 1/2016 |
| KR | 10-1721664 B1 | 4/2017 |
| KR | 10-1808288 B1 | 12/2017 |
| WO | 2010127701 A1 | 11/2010 |
| WO | 2013014720 A1 | 1/2013 |

OTHER PUBLICATIONS

Richard Morris, "Armdroid 1," Blogger, Jul. 13, 2014, (2 total pages).

Brewer et al., "A Friction Differential and Cable Transmittsion Design for a 3-DOF Haptic Device with Spherical Kinematics," 2011 IEEE/RSJ International Conference on Intelligent Robots and Systems, Sep. 2011, (8 total pages).

Hagn et al., "The DLR MIRO: a versatile lightweight robot for surgical applications," Emerald Group Publishing Limited, Instrustrial Robot: An International Journal, vol. 35, No. 4, 2008, (13 total pages).

International Search Report (PCT/ISA/210) dated Sep. 28, 2021 in International Application No. PCT/KR2021/008360.

Written Opinion (PCT/ISA/237) dated Sep. 28, 2021 in International Application No. PCT/KR2021/008360.

Communication issued on Sep. 29, 2023 by the European Patent Office in European Patent Application No. 21850583.2.

\* cited by examiner

JOINT DEVICE FOR ROBOT

CROSS-REFERENCE TO RELATED APPLICATIONS

This application is a by-pass continuation application of International Application No. PCT/KR2021/008360, filed on Jul. 1, 2021, which is based on and claims priority to Korean Patent Application No. 10-2020-0093748, filed on Jul. 28, 2020, and Korean Patent Application No. 10-2020-0122546, filed on Sep. 22, 2020, in the Korean Intellectual Property Office, the disclosures of which are incorporated by reference herein in their entireties.

BACKGROUND

1. Field

The disclosure relates to a joint device for a robot, and more particularly, to a joint device for a robot having two-directional degrees of freedom of rotation using friction wheels.

2. Description of Related Art

A joint structure used in a robot may be manufactured in such a manner that a plurality of rotation shafts are sequentially combined. Specifically, a joint for a robot has a series structure in which a motor is directly connected to each rotation shaft, a link structure in which a heavy motor is concentrated to a lower end of a mechanism using a wire or a link, or an interference drive structure in which a plurality of degrees of freedom are connected in parallel.

The interference drive structure is widely used as a joint structure for a robot because a weight can be efficiently distributed by disposing a drive source near an upper shaft, a structure is simple, and modularization can be made in units of shafts.

In the related art, interference drive structures mainly use bevel gears or wires. However, in a case where a bevel gear is used, there are problems in that the gear needs to be machined with high precision, the production cost is very high, and it is difficult to support a load in an axial direction. In addition, when a wire is used, there are problems in that a degree of difficulty is high in terms of assembly and maintenance, and the volume of the entire structure increases because the wire needs to have a radius of curvature having a specific value or more.

SUMMARY

Provided is a joint device for a robot having two-directional degrees of freedom of rotation using friction wheels.

According to an aspect of the disclosure, a joint device for a robot, includes: a first shaft; a second shaft disposed perpendicular to the first shaft; a first friction wheel rotatably supported by a first end of the first shaft; a second friction wheel rotatably supported by a second end of the first shaft; a driving device configured to rotate each of the first friction wheel and the second friction wheel; and a third friction wheel rotatably supported by a first end of the second shaft, and contacting the first friction wheel and the second friction wheels, wherein when the first friction wheel and the second friction wheel rotate in the same direction, the third friction wheel rotates in a pitch direction, and when the first friction wheel and the second friction wheel rotate in different directions, the third friction wheel rotates in a roll direction.

Each of the first friction wheel, the second friction wheel, and the third friction wheel may have a truncated cone shape, and
a side surface of the third friction wheel contacts a side surface of each of the first friction wheel and the second friction wheel.

The third friction wheel may contact the first friction wheel along a first line, the third friction wheel may contact the second friction wheel along a second line, and the first line and the second line may intersect at an intersection between a central axis of the first shaft and a central axis of the second shaft.

The joint device may further include: a first pressing member pressing the first friction wheel toward the third friction wheel; and a second pressing member pressing the second friction wheel toward the third friction wheel.

Each of the first pressing member and the second pressing member may include a disk spring fitted on the first shaft.

The joint device may further include: a first nut fitted at the first end of the first shaft to support an end of the first pressing member; and a second nut fitted at the second end of the first shaft to support an end of the second pressing member.

The joint device may further include: a first bearing interposed between the first shaft and the first friction wheel; and a second bearing interposed between the first shaft and the second friction wheel.

Each of the first bearing and the second bearing may be an angular ball bearing.

The joint device may further include: a first pressing member pressing the first friction wheel toward the third friction wheel; and a second pressing member pressing the second friction wheel toward the third friction wheel, the first bearing may include an inner ring that contacts the first pressing member, and an outer ring that contacts the first friction wheel, and the second bearing member includes an inner ring that contacts the second pressing member, and an outer ring that contacts the second friction wheel.

The first pressing member may have a convex shape toward the inner ring of the first bearing, and the second pressing member may have a convex shape toward the inner ring of the second bearing.

The driving device may include: a first motor configured to rotate the first friction wheel; and a second motor configured to rotate the second friction wheel.

The driving device may further include: a first pulley coupled to the first friction wheel; a second pulley coupled to the second friction wheel; a first timing belt configured to provide a driving force of the first motor to the first pulley; and a second timing belt configured to provide a driving force of the second motor to the second pulley.

The joint device may further include: a fourth friction wheel rotatably supported by a second end of the second shaft, the second shaft intersecting the first shaft, and the fourth friction wheel may contact each of the first friction wheel and the second friction wheel.

The joint device may further include: a frame rotatably supporting the first end and the second end of the first shaft.

The first shaft and the second shaft may be integrally formed, when the first friction wheel and the second friction wheel rotate in the same direction, the first shaft, the second shaft, and the third friction wheel may rotate around the first shaft, and when the first friction wheel and the second friction wheel rotate in different directions, the third friction wheel may rotate around the second shaft.

DETAILED DESCRIPTION

It should be understood that embodiments to be described below are exemplarily provided to help the understanding of the disclosure, and the disclosure may be modified in various ways, unlike the embodiments described herein. However, in the following description of the disclosure, if it is determined that a detail description of a related known function or component may unnecessarily obscure the gist of the disclosure, the detailed description and concrete illustration thereof will be omitted. Further, the accompanying drawings are not necessarily illustrated to scale but dimensions of some components may be exaggerated to help the understanding of the disclosure.

The terms used in the specification and the claims are general terms selected in consideration of functions in the disclosure. However, these terms may vary depending on intentions of those skilled in the art, legal or technical interpretation, emergence of new technologies, and the like. Also, some terms may be arbitrarily selected by the applicant. These terms may be construed as meanings defined in the specification, and may be construed based on the entire text of the specification and the common technical knowledge in the art unless specifically defined.

In the specification, the expressions "have", "may have", "include", "may include", and the like indicate the presence of stated features (e.g., numbers, functions, operations, or components such as parts), but do not preclude the presence or additional features.

In addition, in the specification, components required for describing each embodiment of the disclosure are described, and the components are not necessarily limited thereto. Therefore, some components may be changed or omitted and other components may be added. In addition, components may be arranged in different independent devices in a distributed manner.

Furthermore, embodiments of the disclosure will hereinafter be described in detail with reference to the accompanying drawings and contents described in the accompanying drawings, but the disclosure is not limited or restricted by the embodiments.

Hereinafter, the disclosure will be described in more detail with reference to the accompanying drawings.

Figure 1:
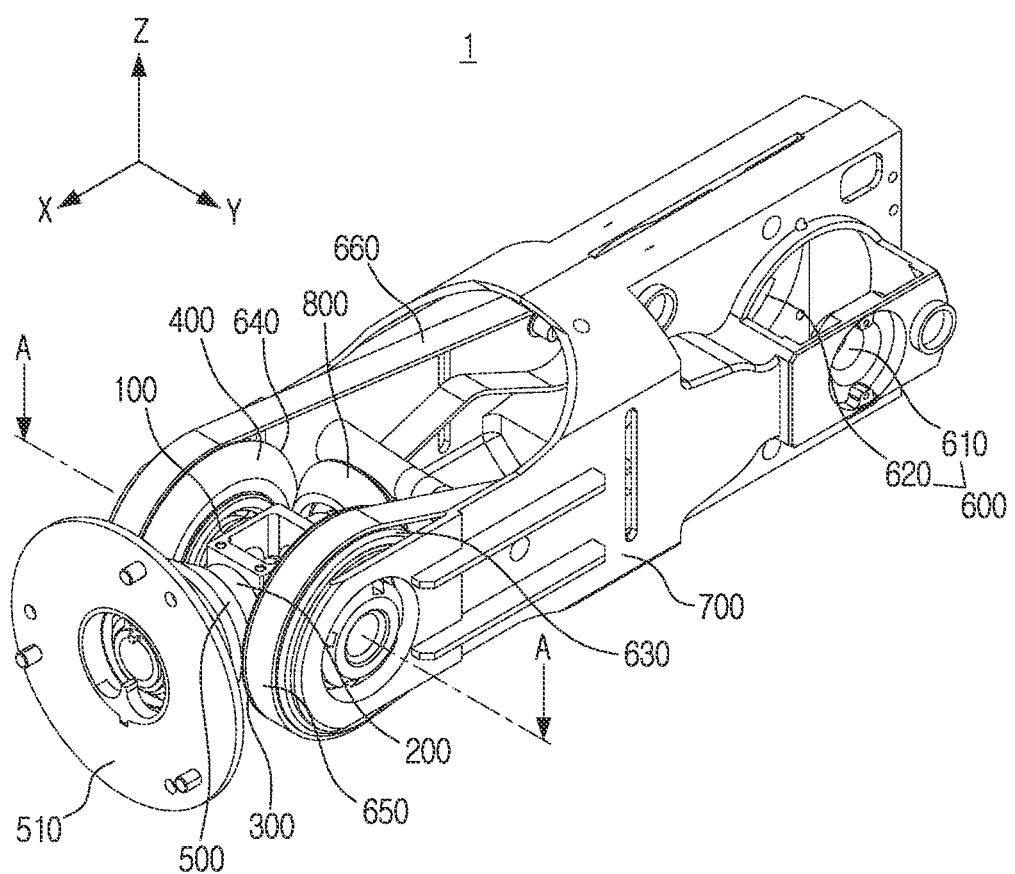
FIG. 1 is a perspective view of a joint device for a robot according to an embodiment of the disclosure.
Figure 2:
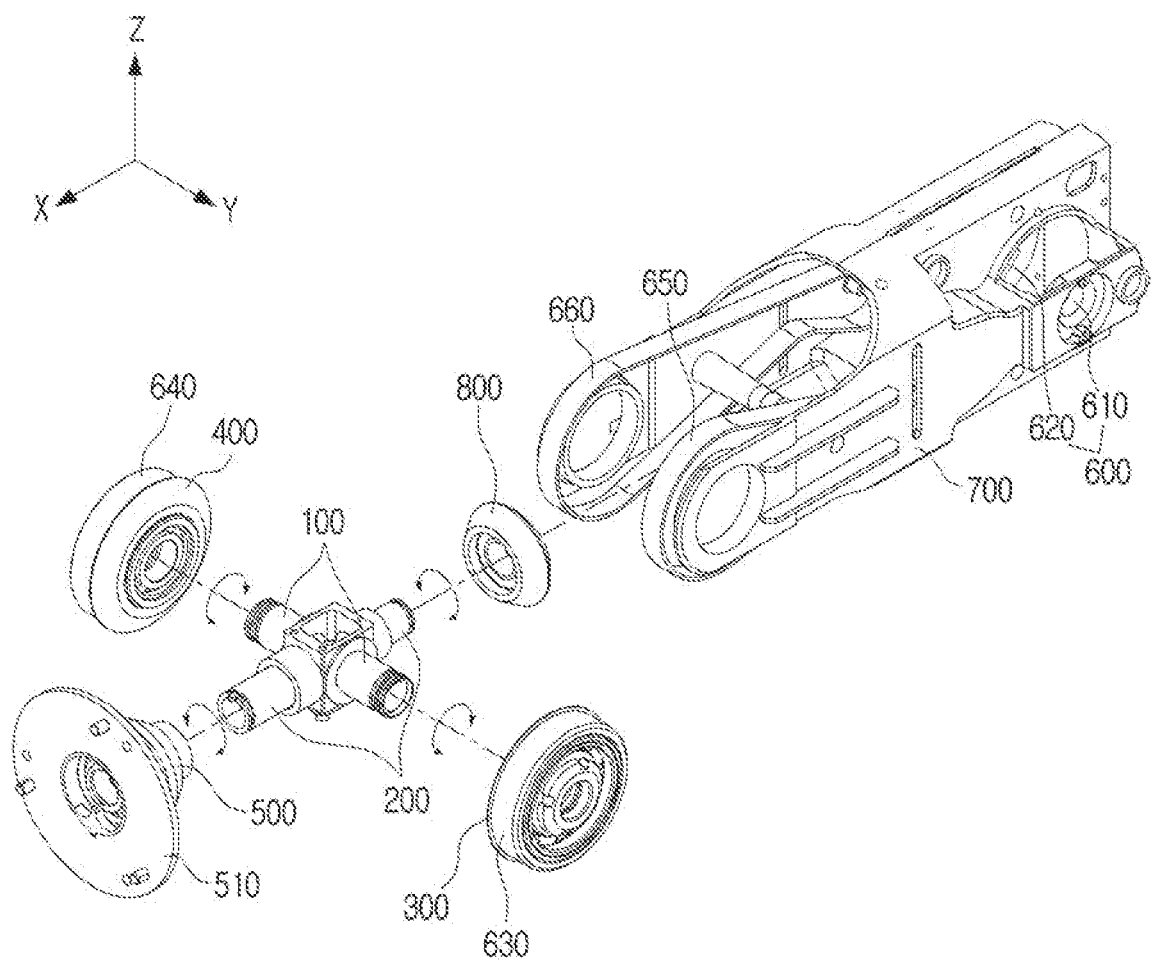
FIG. 2 is an exploded perspective view of the joint device for the robot of FIG. 1.
Figure 3:
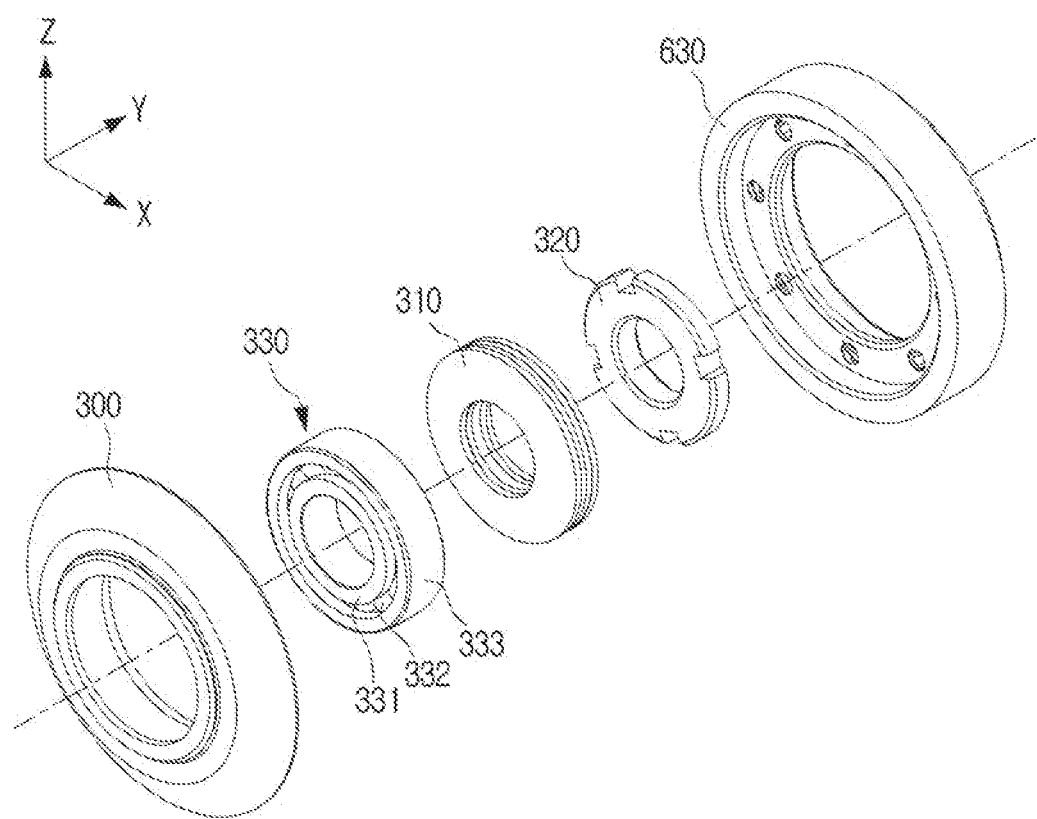
FIG. 3 is an exploded perspective view of components fitted on a first shaft.
Figure 4:
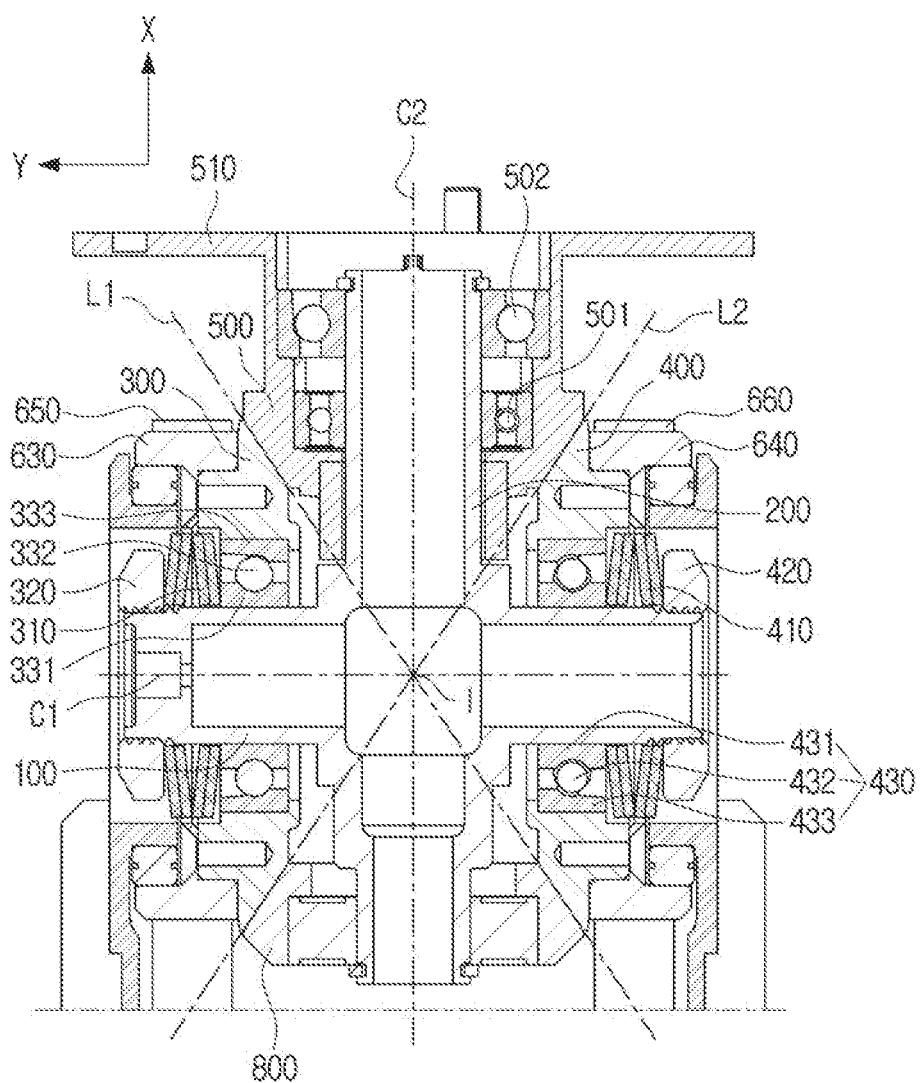
FIG. 4 is a cross-sectional view taken along line A-A of the joint device for the robot of FIG. 1.

FIG. 1 is a perspective view of a joint device for a robot according to an embodiment of the disclosure. FIG. 2 is an exploded perspective view of the joint device for the robot of FIG. 1. FIG. 3 is an exploded perspective view of components fitted on a first shaft. FIG. 4 is a cross-sectional view taken along line A-A of the joint device for the robot of FIG. 1.

Referring to FIGS. 1 to 4, a joint device 1 for a robot according to an embodiment of the disclosure may include a first shaft 100, a second shaft 200, a first friction wheel 300, a second friction wheel 400, a third friction wheel 500, and a driving device 600.

The first shaft 100 may rotatably support the first friction wheel 300 and the second friction wheel 400 at opposite ends of the first shaft 100, respectively. Accordingly, the first and second friction wheels 300 and 400 may rotate around the first shaft 100 with the same rotation axis.

The first shaft 100 may be disposed parallel to a Y axis. That is, the rotation axis of the first and second friction wheels 300 and 400 may be parallel to the Y axis. The first shaft 100 may have a cylindrical shape.

The second shaft 200 may rotatably support the third friction wheel 500 at one end of the second shaft 200. Accordingly, the third friction wheel 500 may rotate around the second shaft 200.

The second shaft 200 may be disposed perpendicular to the first shaft 100. For example, the second shaft 200 may be disposed parallel to an X axis. That is, a rotation axis of the third friction wheel 500 may be parallel to the X axis. Like the first shaft 100, the second shaft 200 may have a cylindrical shape.

The second shaft 200 may be integrally formed with the first shaft 100. Specifically, the first and second shafts 100 and 200 may together form an integral shaft having a "T" or "X" shape to rotatably support the first, second, and third friction wheels 300, 400, and 500. However, the first and second shafts 100 and 200 may be formed separately, rather than integrally formed.

The first friction wheel 300 and the second friction wheel 400 may rotate in a state where they are fitted on the first shaft 100. The first and second friction wheels 300 and 400 may have a truncated cone shape.

The first and second friction wheels 300 and 400 may be arranged to be symmetric with respect to the second shaft 200. Specifically, the first and second friction wheels 300 and 400 may be disposed to have a cross section that becomes smaller as being closer to the second shaft 200.

The third friction wheel 500 may rotate in a state where they are fitted on the second shaft 200. The third friction wheel 500 may have a truncated cone shape. Specifically, the third friction wheel 500 may be disposed to have a cross section that becomes smaller as being closer to the first shaft 100.

The third friction wheel 500 may contact the first and second friction wheels 300 and 400 simultaneously at different positions. Accordingly, the third friction wheel 500 may be passively rotated by a rotational force transferred from the first and second friction wheels 300 and 400 due to a frictional force generated in portions contacting the first and second friction wheels 300 and 400.

The first, second, and third friction wheels 300, 400, and 500 may be formed of aluminum, but their material is not limited thereto. Accordingly, it is possible to reduce the weight of the joint device 1 for the robot and lower the overall specifications of the joint device 1 for the robot.

In addition, the first, second, and third friction wheels 300, 400, and 500 may smoothly rotate without noise because they continuously contact each other without teeth formed on their surfaces, which does not cause backlash. In addition, the first, second, and third friction wheels 300, 400, and 500 may be produced at a lower cost than gears, and may require fewer parts than wires, thereby reducing maintenance costs.

Specifically, a side surface of the third friction wheel 500 may simultaneously contact respective side surfaces of the first and second friction wheels 300 and 400. Specifically, the third friction wheel 500 may contact the first friction wheel 300 along a first line L1, and contact the second friction wheel 400 along a second line L2. Also, the first and second lines L1 and L2 may intersect at an intersection between central axes C1 and C2 of the first and second shafts 100 and 200.

When the first and second friction wheels 300 and 400 rotate in the same direction, the third friction wheel 500 may rotate in a pitch direction because the third friction wheel 500 receives a frictional force from the first and second friction wheels 300 and 400 in the same direction. The pitch direction may be a direction of rotation with respect to a rotation axis parallel to the Y axis.

When the first and second friction wheels 300 and 400 rotate in opposite directions, the third friction wheel 500 may rotate in a roll direction because the third friction wheel 500 receives a frictional force from the first and second friction wheels 300 and 400 in different directions. The roll direction may be a direction of rotation with respect to a rotation axis parallel to the X axis.

That is, the third friction wheel 500 may be passively rotated by a rotational force transferred from the first and second friction wheels 300 and 400, and may have two degrees of freedom of rotation depending on the rotation directions of the first and second friction wheels 300 and 400. A process in which the third friction wheel 500 rotates based on the two degrees of freedom of rotation will be described in detail with reference to FIGS. 5 and 6.

A connection plate 510 may be disposed on a front surface of the third friction wheel 500. The connection plate 510 may have a disk shape and may be coupled to the third friction wheel 500 to rotate integrally with the third friction wheel 500.

Any one of various robot structures may be coupled to the connection plate 510. For example, any one of various parts of the robot, such as an arm, a hand, a foot, a leg, and a head, may be coupled to the connection plate 510 to rotate together with the third friction wheel 500.

Bearings 501 and 502 may be disposed between the third friction wheel 500 and the second shaft 200. Although the two bearings 501 and 502 are illustrated, the number of bearings is not limited thereto.

The bearings 501 and 502 may be angular ball bearings, but the bearing type is not limited thereto. The bearings 501 and 502 enables the third friction wheel 500 to easily rotate relative to the second shaft 200, which is stationary.

The driving device 600 may rotate each of the first and second friction wheels 300 and 400. For example, the driving device 600 may include a first motor 610 and a second motor 620. The first motor 610 may rotate the first friction wheel 300, and the second motor 620 may rotate the second friction wheel 400.

The first and second motors 610 and 620 may be supported by a frame 700, and may be positioned behind the first, second, and third friction wheels 300, 400, and 500.

For example, the driving device 600 may further include a first pulley 630, a second pulley 640, a first timing belt 650, and a second timing belt 660.

The first and second pulleys 630 and 640 may be fitted on the first shaft 100 to rotate around the first shaft 100. The first pulley 630 may be disposed on a rear surface of the first friction wheel 300, and the second pulley 640 may be disposed at a rear surface of the second friction wheel 400.

The first timing belt 650 may partially surround a circumference of the first pulley 630 to provide a driving force of the first motor 610 to the first pulley 630. In addition, the first pulley 630 may be coupled to the first friction wheel 300 to rotate integrally with the first friction wheel 300.

Similarly, the second timing belt 660 may partially surround a circumference of the second pulley 640 to provide a driving force of the second motor 620 to the second pulley 640, and the second pulley 640 may be coupled to the second friction wheel 400 to rotate integrally with the second friction wheel 400.

However, the above-described structure of the driving device 600 is an example, and the structure of the driving device 600 is not limited thereto. The driving device 600 may be implemented in any structure as long as it is capable of rotating the first and second friction wheels 300 and 400.

The joint device 1 for the robot may further include a first pressing member 310 and a second pressing member 410. The first pressing member 310 may press the first friction wheel 300 toward the third friction wheel 500. The second pressing member 410 may press the second friction wheel 400 toward the third friction wheel 500.

As a result, the first and second pressing members 310 and 410 provide a pre-load to the first and second friction wheels 300 and 400, thereby providing a sufficient frictional force to the third friction wheel 500. Accordingly, a rotational force of the first and second friction wheels 300 and 400 may be easily transferred to the third friction wheel 500.

For example, the first and second pressing members 310 and 410 may be disk springs fitted on the first shaft 100. The disc springs are capable of pressurize the first and second friction wheels 300 and 400, respectively, with a large elastic force even with a small displacement. Accordingly, the rotational force of the first and second friction wheels 300 and 400 can be more effectively transferred to the third friction wheel 500, so that the joint device 1 for the robot can be manufactured in a small size.

The joint device 1 for the robot may further include a first nut 320 and a second nut 420. The first nut 320 may be fitted at one end of the first shaft 100 to support one end of the first pressing member 310. The second nut 420 may be fitted at the other end of the first shaft 100 to support one end of the second pressing member 410.

For example, the first and second nuts 320 and 420 may be fixed by screw threads formed on side surfaces of the first shaft 100. The pre-load of the first and second pressing members 310 and 410 may be adjusted depending on how much the first and second nuts 320 and 420 are tightened on the first shaft 100.

The joint device 1 for the robot may further include a first bearing 330 and a second bearing 430. The first bearing 330 may be disposed between the first shaft 100 and the first friction wheel 300. The second bearing 430 may be disposed between the first shaft 100 and the second friction wheel 400.

The first and second bearings 330 and 430 enable the first and second friction wheels 300 and 400 to easily rotate relative to the first shaft 100, which is stationary.

The first and second bearings 330 and 430 may be angular ball bearings, each being capable of transferring an axial-directional load in an easier way. The angular ball bearing is capable of transferring a load in an axial direction as well as in a radial direction in an easy way because a straight line connecting contact points between a ball and inner and outer rings forms a predetermined angle with respect to the radial direction.

Accordingly, the first bearing 330 makes it possible to more easily transfer an elastic force transferred from the first pressing member 310 to the first friction wheel 300. Similarly, the second bearing 430 makes it possible to more easily transfer an elastic force from the second pressing member 410 to the second friction wheel 400.

Specifically, the inner ring 331 and the outer ring 333 of the first bearing 330 may contact the first pressing member 310 and the first friction wheel 300, respectively. Accordingly, an elastic force of the first pressing member 310 may be transferred sequentially through the inner ring 331, the ball 332, and the outer ring 333 of the first bearing 330, and finally transferred to the first friction wheel 300.

Similarly, the inner ring 431 and the outer ring 433 of the second bearing 430 may contact the second pressing member 410 and the second friction wheel 400, respectively. Accordingly, an elastic force of the second pressing member 410 may be transferred sequentially through the inner ring 431, the ball 432, and the outer ring 433 of the second bearing 430, and finally transferred to the second friction wheel 400.

That is, the first and second pressing members 310 and 410 may press the inner rings 331 and 431 of the first and second bearings 330 and 430, which are stationary together with the first shaft 100. Accordingly, since the objects pressed by the first and second pressing members 310 and 410 are stationary, it is possible to minimize wear resulting from friction.

In addition, the first and second pressing members 310 and 410 may have a convex shape toward the inner rings 331 and 431 of the first and second bearings 330 and 430. For example, the first and second pressing members 310 and 410 may be cone-shaped disk springs each having an opening in a central portion.

Accordingly, the above-described shape of the first and second pressing members 310 and 410 makes it possible to press only the inner rings 331 and 431, which are stationary, not the outer rings 333 and 433, which are rotating, respectively.

The frame 700 may be disposed on a rear side of the joint device 1 for the robot to support the first shaft 100 and the driving device 600. However, this is an example, and the shape and the arrangement of the frame 700 are not limited thereto.

In addition, the joint device 1 for the robot may further include a fourth friction wheel 800. The fourth friction wheel 800 may be rotatably supported at the other end of the second shaft 200 intersecting the first shaft 100.

The fourth friction wheel 800 may contact each of the first and second friction wheels 300 and 400. For example, the fourth friction wheel 800 may have a truncated cone shape, and a side surface of the fourth friction wheel 800 may contact the side surfaces of the first and second friction wheels 300 and 400 simultaneously at different positions.

The fourth friction wheel 800 may have a shape to be symmetric to the third friction wheel 500 with respect to the first shaft 100. Specifically, the fourth friction wheel 800 may have a truncated cone shape with a cross section gradually decreasing toward the first shaft 100.

The fourth friction wheel 800 may face the third friction wheel 500, and may rotate in the opposite direction to the third friction wheel 500.

In addition, the fourth friction wheel 800 may support an area of each of the first and second pressing members 310 and 410 on the rear side thereof. Accordingly, the fourth friction wheel 800 may prevent the first and second friction wheels 300 and 400 from being deformed or the rotational axis of the first and second friction wheels 300 and 400 from being misaligned due to the elastic force of the first and second pressing members 310 and 410.

Figure 5:
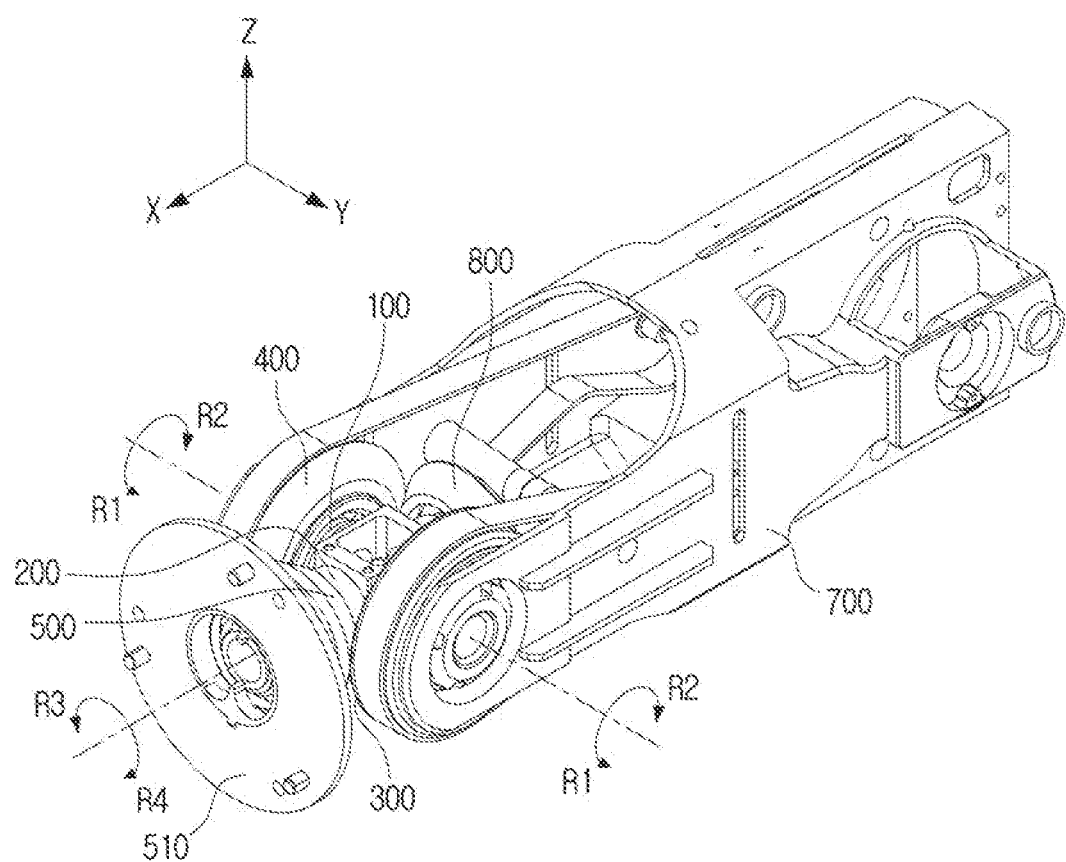
FIG. 5 is a view illustrating a state in which a third friction wheel rotates in a roll direction.

FIG. 5 is a view illustrating a state in which the third friction wheel rotates in the roll direction. Referring to FIG. 5, the first and second friction wheels 300 and 400 may rotate in different directions.

For example, when the first friction wheel 300 rotates in an R1 direction and the second friction wheel 400 rotates in an R2 direction, the third friction wheel 500 rotates around the second shaft 200 in an R4 direction. At this time, the fourth friction wheel 800 may rotate around the second shaft 200 in an R3 direction as opposed to the third friction wheel 500.

Conversely, when the first friction wheel 300 rotates in the R2 direction and the second friction wheel 400 rotates in the R1 direction, the third friction wheel 500 may rotate around the second shaft 200 in the R3 direction. At this time, the fourth friction wheel 800 may rotate around the second shaft 200 in the R4 direction as opposed to the third friction wheel 500.

That is, when the first and second friction wheels 300 and 400 rotate in different directions, the third friction wheel 500 may rotate around the second shaft 200 in the roll direction.

Figure 6:
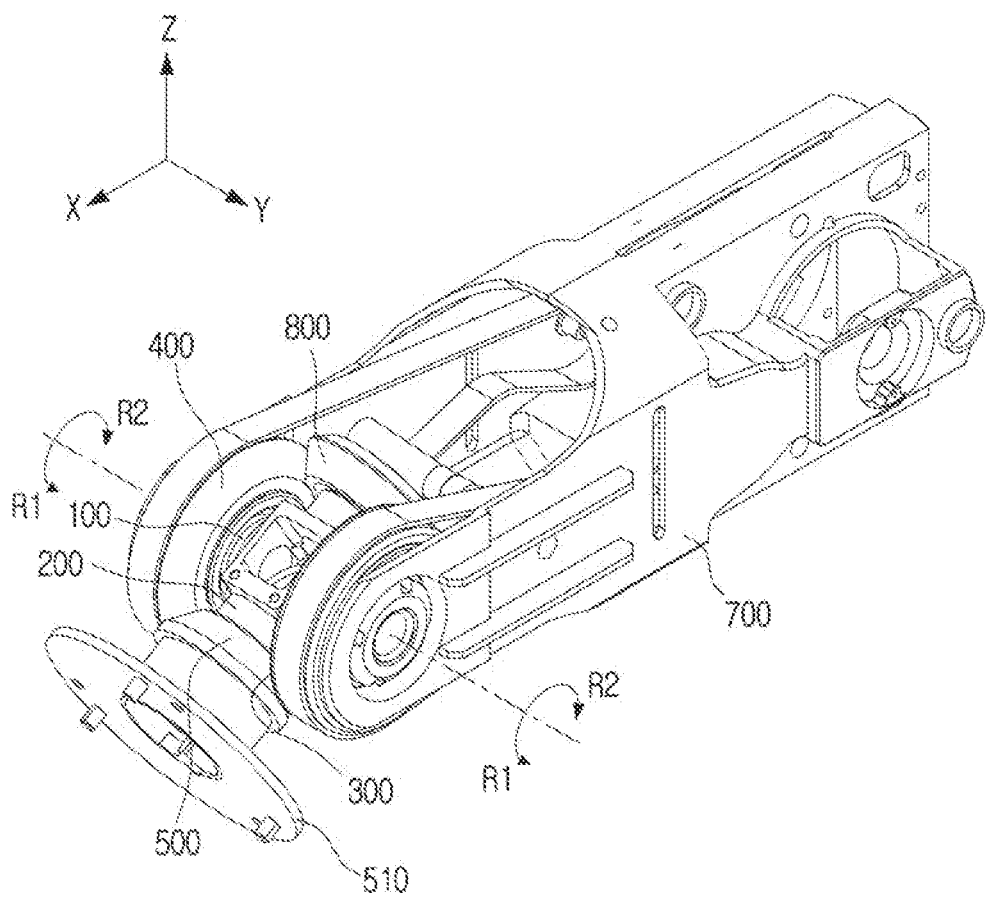
FIG. 6 is a view illustrating a state in which the third friction wheel rotates in a pitch direction.

FIG. 6 is a view illustrating a state in which the third friction wheel rotates in a pitch direction. Referring to FIG. 6, the first and second friction wheels 300 and 400 may rotate in the same direction.

For example, when both the first and second friction wheels 300 and 400 rotate in the R1 direction, the third friction wheel 500 may rotate around the first shaft 100 in the R1 direction. At this time, the fourth friction wheel 800 may rotate around the first shaft 100 in the R2 direction as opposed to the third friction wheel 500.

Conversely, when both the first and second friction wheels 300 and 400 rotate in the R2 direction, the third friction wheel 500 may also rotate around the first shaft 100 in the R2 direction. At this time, the fourth friction wheel 800 may rotate around the first shaft 100 in the R1 direction as opposed to the third friction wheel 500.

Specifically, the frame 700 may rotatably support both ends of the first shaft 100, and the first and second shafts 100 and 200 may be integrally formed. In this case, when the first and second friction wheels 300 and 400 rotate in the same direction, the first shaft 100, the second shaft 200, and the third friction wheel 500 may rotate around the first shaft 100 in the R1 or R2 direction.

That is, when the first and second friction wheels 300 and 400 rotate in the same direction, the third friction wheel 500 may rotate around the first shaft 100 in the pitch direction.

Accordingly, the third friction wheel 500 may be passively rotated with two degrees of freedom of rotation depending on the rotation directions of the first and second friction wheels 300 and 400.

Although embodiments of the disclosure have been illustrated and described, the disclosure is not limited to the specific embodiments as described above, and may be variously modified by those skilled in the art to which the disclosure pertains without departing from the gist of the disclosure as claimed in the appended claims. Such modifications fall within the scope of the claims.

What is claimed is:

1. A joint device for a robot, the joint device comprising:
a first shaft;
a second shaft disposed perpendicular to the first shaft;
a first friction wheel rotatably supported by a first end of the first shaft;
a second friction wheel rotatably supported by a second end of the first shaft;
a driving device configured to rotate each of the first friction wheel and the second friction wheel; and
a third friction wheel rotatably supported by a first end of the second shaft, and contacting the first friction wheel and the second friction wheel, wherein when the first friction wheel and the second friction wheel rotate in the same direction, the third friction wheel rotates in a pitch direction, and wherein when the first friction wheel and the second friction wheel rotate in different directions, the third friction wheel rotates in a roll direction, and wherein the joint device further comprises:
- a first pressing member configured to press the first friction wheel toward the third friction wheel;
- a second pressing member configured to press the second friction wheel toward the third friction wheel;
- a first angular ball bearing interposed between the first shaft and the first friction wheel;
- a second angular ball bearing interposed between the first shaft and the second friction wheel;
- a first nut fitted at the first end of the first shaft to support an end of the first pressing member; and
- a second nut fitted at the second end of the first shaft to support an end of the second pressing member.

2. The joint device of claim 1, wherein each of the first friction wheel, the second friction wheel, and the third friction wheel has a truncated cone shape, and wherein a side surface of the third friction wheel contacts a side surface of each of the first friction wheel and the second friction wheel.

3. The joint device of claim 2, wherein the third friction wheel contacts the first friction wheel along a first line, wherein the third friction wheel contacts the second friction wheel along a second line, and wherein the first line and the second line intersect at an intersection between a central axis of the first shaft and a central axis of the second shaft.

4. The joint device of claim 1, wherein each of the first pressing member and the second pressing member comprises a disk spring fitted on the first shaft.

5. The joint device of claim 1, further comprising:

wherein the first angular ball bearing comprises an inner ring that contacts the first pressing member, and an outer ring that contacts the first friction wheel, and wherein the second angular ball bearing comprises an inner ring that contacts the second pressing member, and an outer ring that contacts the second friction wheel.

6. The joint device of claim 5, wherein the first pressing member has a convex shape toward the inner ring of the first angular ball bearing, and the second pressing member has a convex shape toward the inner ring of the second angular ball bearing.

7. The joint device of claim 5, wherein the first pressing member does not contact the outer ring of the first angular ball bearing, and wherein the second pressing member does not contact the outer ring of the second angular ball bearing.

8. The joint device of claim 5, wherein the inner ring of the first angular ball bearing is configured to remain stationary relative to the first shaft and the outer ring of the first angular ball bearing is configured to rotate with the first friction wheel, and wherein the inner ring of the second angular ball bearing is configured to remain stationary relative to the first shaft and the outer ring of the second angular ball bearing is configured to rotate with the second friction wheel.

9. The joint device of claim 1, wherein the driving device comprises:
- a first motor configured to rotate the first friction wheel; and
- a second motor configured to rotate the second friction wheel.

10. The joint device of claim 9, wherein the driving device further comprises:
- a first pulley coupled to the first friction wheel;
- a second pulley coupled to the second friction wheel;
- a first timing belt configured to provide a driving force of the first motor to the first pulley; and
- a second timing belt configured to provide a driving force of the second motor to the second pulley.

11. The joint device of claim 1, further comprising:
- a fourth friction wheel rotatably supported by a second end of the second shaft, the second shaft intersecting the first shaft, wherein the fourth friction wheel contacts each of the first friction wheel and the second friction wheel.

12. The joint device of claim 1, further comprising:
- a frame rotatably supporting the first end and the second end of the first shaft.

13. The joint device of claim 12, wherein the first shaft and the second shaft are integrally formed, wherein when the first friction wheel and the second friction wheel rotate in the same direction, the first shaft, the second shaft, and the third friction wheel rotate around the first shaft, and wherein when the first friction wheel and the second friction wheel rotate in different directions, the third friction wheel rotates around the second shaft.

* * * * *